United States Patent
Friede et al.

(10) Patent No.: US 6,684,138 B1
(45) Date of Patent: Jan. 27, 2004

(54) DYNAMIC PLATFORM LEVELING SYSTEM

(75) Inventors: John Friede, Walcott, IA (US); Mitchell P. Schmalz, Iowa City, IA (US)

(73) Assignee: HWH Corporation, Moscow, IA (US)

( * ) Notice: Subject to any disclaimer, the term of this patent is extended or adjusted under 35 U.S.C. 154(b) by 43 days.

(21) Appl. No.: 10/063,989

(22) Filed: May 31, 2002

(51) Int. Cl.[7] .................................................. G06F 7/00
(52) U.S. Cl. .................... 701/36; 280/6.15; 33/366.12; 73/290 R
(58) Field of Search ...................... 701/36, 37; 280/5.5, 280/6.15, 6.153; 73/290 R, 291; 33/366.12, 369

(56) References Cited

U.S. PATENT DOCUMENTS

| | | |
|---|---|---|
| 4,061,309 A | 12/1977 | Hanser |
| 4,165,861 A | 8/1979 | Hanser |
| 4,597,584 A | 7/1986 | Hanser |
| 4,743,037 A | 5/1988 | Hanser |
| 4,746,133 A | 5/1988 | Hanser et al. |
| 4,858,137 A * | 8/1989 | Bradley ..................... 701/124 |
| 5,182,947 A * | 2/1993 | Fidelak et al. ............. 73/304 C |
| 6,050,573 A | 4/2000 | Kunz |

OTHER PUBLICATIONS

HL–PLANARTECHNIK GMBH—"Inclination Sensor ±25° —NS25/E2 Application Notes".

* cited by examiner

Primary Examiner—William A. Cuchlinski, Jr.
Assistant Examiner—Olga Hernandez
(74) Attorney, Agent, or Firm—James C. Nemmers

(57) ABSTRACT

An improved, dynamic level detection and leveling system utilizing a biaxial inclinosensor to generate a series of measurements that reflect a level of tilt. When sufficient measurements have been collected, an average value is obtained. If the average value obtained exceeds (in either direction, low or high) a selected value limit, then corrective action may be instituted, or a signal may be generated to indicate a need for automatic or manual correction. Such measurements are taken along both axes of the biaxial sensor. Leveling system response is minimized by selecting not only a value limit, but also a value null limit.

5 Claims, 3 Drawing Sheets

DYNAMIC PLATFORM LEVELING SYSTEM

BACKGROUND OF INVENTION

The present invention is an improved leveling system for achieving and maintaining a desired, level position for a platform or structure. The predominant application of the present invention will be in recreational vehicles and motor coaches that are driven from place to place and parked for substantial periods of time on potentially uneven surfaces. However, other applications—including applications on generally fixed structures subject to vibration, tilting, or other disturbances—will be understood to be encompassed by the presently claimed invention.

Leveling systems of various types for recreational vehicles are known in the art and have been sold for many years. Examples of such leveling systems may be found in U.S. Pat. Nos. 4,746,133, 4061,309, 4,165,861, 4,597,584, and 4,743,037. The '584 and '037 patents disclose an automatic leveling system including a fluid-based level sensor. The level sensor of the '584 patent comprises a group of switches disposed in a plane. The switches of the '584 patent comprise housings having a blob of mercury contained therein. The mercury is disposed within the housing with an open circuit that may be closed by the conductive mercury when a selected range of leveling positions cause the blob of mercury to move into position and serve as a bridge between the otherwise open circuit ends.

In the '584 and '037 patents, the switches are disposed to detect level disturbance individually for each wheel. The '133 patent utilizes switches similar to those just described, but in a disposition that detects level disturbances at a shift of about 45 degrees from the detection positions disclosed in the earlier patents. The '133 patent allows control of leveling through actuation of paired jacks (rear, front, left, or right). In addition, the '133 patent discloses the use of an air bag leveling system.

Notwithstanding these leveling systems, there has remained a need for an improved, dynamic level sensing and level adjustment control system to achieve and maintain a level structure efficiently, with a minimum of movement. There has further been a need for a level sensor that accommodates generally unavoidable conditions such as changes in the volume of a fluid sensor material associated with temperature changes, mechanical disturbances caused by passenger or occupant activity, or vibration caused by engines, drive systems or road conditions while the vehicle is in motion.

In addition to the circuit closing sensors of the type described, there are known fluid-based level sensors that depended on differential wetting of an electrode or terminal. In theory, the differential wetting allows determination of a fluid level and therefore plane orientation or tilt. However, such systems have inherent infirmities due to boundary layer effects, the interference of the probes, terminals, or electrodes with the movement of the fluid, or changes in fluid volume and viscosity due to temperature changes. For application in recreational vehicles where the vehicles may travel through regions of dramatically changing temperature extremes and experience motion due to moving passengers, correction of temperature change infirmities and the minimization of system response to minor vibrations are important considerations. Sealed biaxial inclinosensor technology utilizing conductometric measurement via thin film sensor substrates provides a convenient method to overcome these infirmities.

A technology has been developed by others and is employed within the method and system of the present invention. The technology relates to a biaxial inclinosensor such as the NS-25/B2 produced and marketed by HL-Planartechnik Gmbh, Hauert 13, D-44227, Dortmund, Germany, which is disclosed in U.S. Pat. No. 5,182,947. Such sensors employ a sealed chamber with a thin-film sensor substrate disposed on a portion of the bottom of the chamber. The sealed chamber is typically ceramic to provide for maximum durability across a wide variety of temperatures and conditions. The chamber is partially filled with an electroconductive fluid (the particular fluid and amount of fluid may vary from application to application depending on the range of measurements deemed to be consequential for the application). Voltage potential differences may be applied at locations on the sensor substrate along the chamber bottom wall and the resultant electrical field generated by the flow of current through the fluid and between the terminals may be detected at a selected location on the thin film sensor substrate. With this known technology, the level of fluid above a detection point may be determined.

The basic methodology of such biaxial inclinosensors and conductometric measurements are known and, as such, are not discussed at further length herein. FIGS. 1 and 2 (prior art) illustrate such a sealed-chamber, biaxial inclinosensor. FIG. 3 (prior art) illustrates a microprocessor and circuitry associated with such a sensor.

Notwithstanding this known art as illustrated in FIGS. 1–3, there has remained a need for a level detection and correction system and method that better accommodates disturbances in recreational vehicles created by vibration from engine operation, occupant movements, etc. It is therefore an object of the present invention to provide a system for level or level disturbance detection that overcomes the noise of vehicle or structure vibration. It is a further object of the present invention to provide a system for level correction that is integrated with the system for level detection. It is a further object of the present invention to provide such a system that may be used to level recreational vehicles with selected ranges of disturbance without taxing the leveling system drive components through constant response to minor disturbances that need no correction. It is a further object to provide such systems utilizing conductometric measurement principles.

SUMMARY OF INVENTION

The present invention is an improved, dynamic level detection and leveling system. A biaxial inclinosensor is used to generate a series of measurements that reflect a level of tilt associated with a plane that a user desires to maintain level. When sufficient measurements have been collected, an average value is obtained. If the average value obtained exceeds (in either direction, low or high) a selected value limit, then corrective action may be instituted, or a signal may be generated to indicate a need for automatic or manual correction. Such measurements are taken along both axes of the biaxial sensor.

It is preferred to minimize leveling system response by selecting not only a value limit, but also a null value limit. The value limit is used to determine an outside range of acceptable values for averaged measurements. When the value limit is exceeded, the corrective action is instituted, but since the values are averaged over a sampling of times it will not adjust the leveling for every slight and temporary change. Such corrective action would require almost continual adjustment of the hydraulic, pneumatic, electric, or other drive mechanisms used to adjust the level of the structure. Similarly, it is not sufficient to merely correct the imbalance or disturbance to a point just within the range defined by the value limits. Such a correction would often result in an almost immediate need for further correction. Therefore, there is also defined within the present invention a null range of value limitations to define an acceptable range of average values for the termination of corrective action, which range is within the broader range of values used to define the limits for when corrective action should be initiated.

By employing the biaxial inclinosensors having conductometric measurement capabilities, temperature induced fluid changes generally do not impact operation of the level detection system. Use of the thin-film sealed chamber technology eliminates or at least severely minimizes the interference of boundary layer effects with measurement and the interference of physical disturbance of fluid flow by probes that extend into the fluid's path. Finally, the multiple-measurement, averaged value technique of the present invention eliminates constant system response, overcorrection, and over-active leveling system correction through the muting of minor, isolated disturbances, and through the establishment of a broad range of inclination angles that trigger the commencement of corrective action along with a narrower range of inclination angles that trigger the termination of such action.

DETAILED DESCRIPTION

The present invention will be understood by those having ordinary skill in the arts of mechanical control systems and digital control of such mechanical systems.

Figure 1:
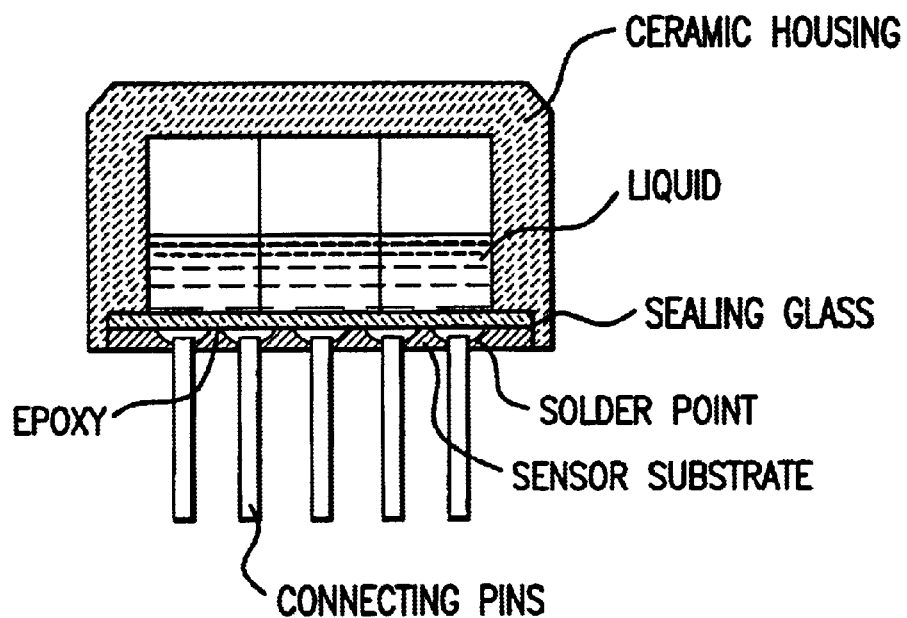
FIG. 1 (prior art) is a simplified, cross section, side view of a sealed biaxial inclinosensor.
Figure 2:
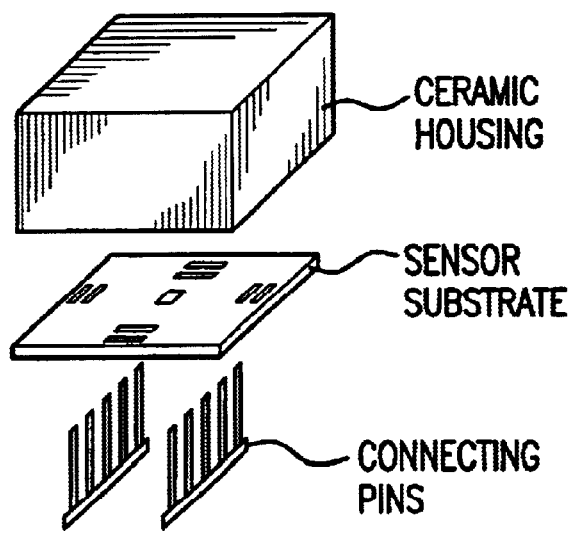
FIG. 2 (prior art) is a simplified, offset perspective view of a disassembled biaxial inclinosensor.
Figure 6:
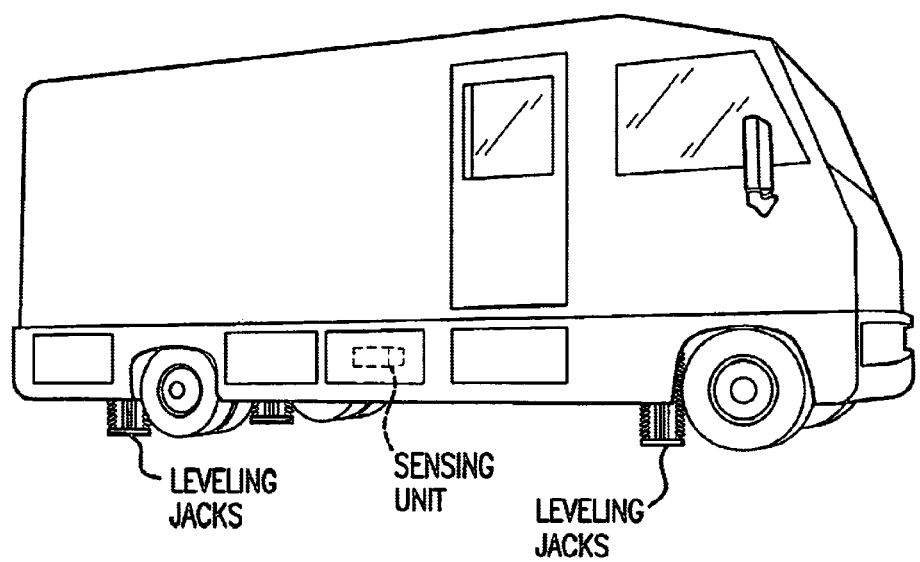
FIG. 6 is a perspective view of a typical recreational vehicle coach having hydraulic leveling components associated with front and rear outside corners.

The preferred embodiment of the invention incorporates a biaxial inclinosensor model NS-25/B2 from HL-Planartechnik GmbH, (see, e.g., FIGS. 1 and 2 which show the prior art) into a planar surface on a recreational vehicle. A typical recreational vehicle is shown in FIG. 6 with the leveling jacks shown extended when the vehicle is parked. The planar surface bearing the inclinosensor is a surface that is desired to be maintained generally parallel to the draw of the earth's gravitational forces. Of course, the benefits of the present invention may be achieved through dual single-axis inclinosensors mounted in offset relationship within the chosen plane. However, to minimize components, a biaxial sensor is preferred.

Figure 3:
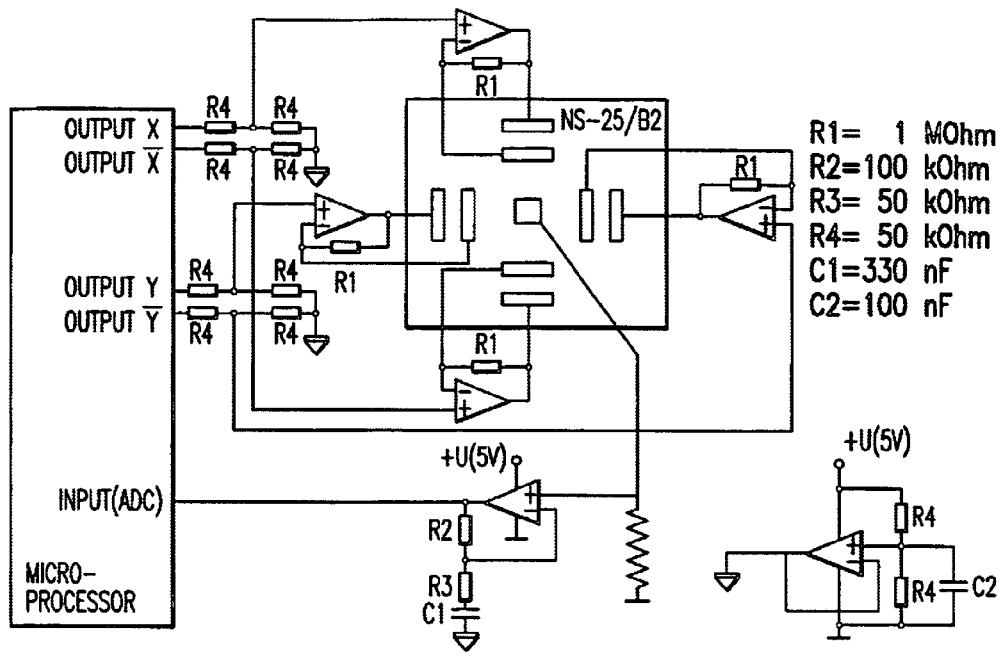
FIG. 3 (prior art) is a circuit diagram illustrating circuitry in the environment of a biaxial inclinosensor and microprocessor.

Circuitry such as the circuitry illustrated in FIG. 3 (prior art) is provided to show the application of selected voltage potentials across a generally central measurement point. Circuitry is also provided to receive electric field detection signals from the selected measurement point. A specifically programmed, microprocessor, preferably a dedicated microprocessor, is provided with an instruction set to carry out the functions as follows.

An orientation is selected such that an X and a Y axis are identified.These axes may be disposed in a manner selected for the convenience of the system designer, but for the purpose of this describing the invention, the X axis is defined as the left to right axis of the recreational vehicle, and the Y axis is defined as the back to front axis of the recreational vehicle of FIG. 6. Along each axis, a central measuring point is treated as a zero and a negative and positive orientation is defined. For the purpose of illustration, the vehicle front is defined as positive (y+), the vehicle rear is defined as negative (y−), the vehicle right is defined as positive (x+), and the vehicle left is defined as negative (x−).

In addition to an orientation, value limits and null value limits are selected. As indicated above, value limits define outside ranges for averaged, measured values. If such averaged values exceed these value limits, then corrective leveling action is triggered as more fully explained hereinafter. Null value limits are selected to correspond to null limit ranges within the value limit ranges.

To obtain measured values that are indicative of plane tilt, conductometric measurements are used. Electric fields are generated within the fluid housed in the sealed chamber of a biaxial inclinosensor such as that shown in FIG. 3 through the application of unequal voltage potentials on opposite sides of a central measuring point. With two voltage application points located along each axis (one each on the positive and negative sides of the measurement point) current can be driven through the inclinosensor fluid between the four application points. As is understood in the field of conductometric measurement, the strength of the electric field detected at the central measurement point is a function of the relative depth of the fluid above each voltage application point. As such, when selecting and applying application voltages that are appropriate for a range of anticipated fluid depth changes and fluid characteristics, a degree of fluid levelness may be determined.

Figure 4:
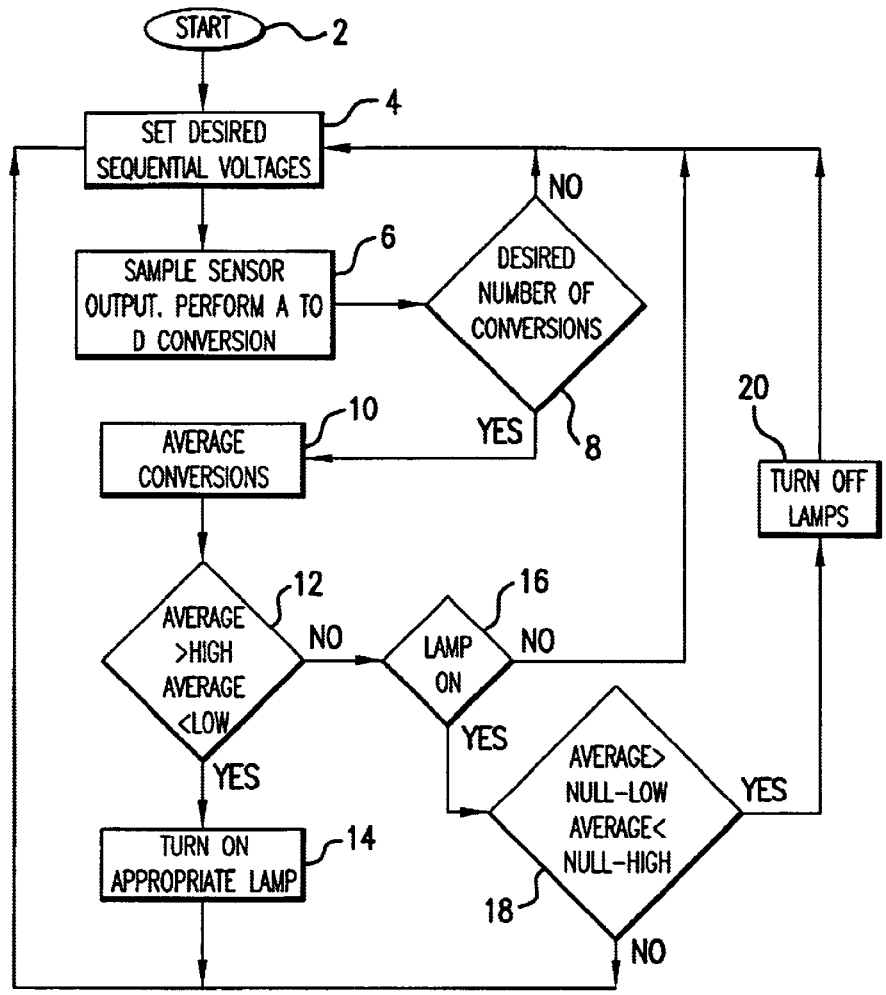
FIG. 4 is a flowchart that illustrates the data collection and control signal generation functions of the present invention.

It is understood that the system of the schematic of FIG. 4 represents only one of the two axis and that a similar system and method are utilized for the other axis. It is also understood that voltage selection and system configuration are determined at the start illustrated at step 2. In the preferred embodiment, the selected voltages are 1.5 and 3.5 volts. Because system response based on individual measurements may lead to overly frequent correction, or unnecessary correction, (i.e. a given measurement may reflect a momentary disturbance to fluid levels, such as a mechanical shock or bump, rather than an unleveled vehicle condition) a selected number of measurements are obtained initially and averaged for comparison to value limits and null value limits. The system is configured to apply the selected voltages at step 4, (3.5 to x+ and 1.5 to x−) to opposing ends of a selected axis and the Y-axis is placed in a high impedance state. After an appropriately selected amount of time, the processor analog to digital converter (ATD) at step 6 takes a sample from the measurement point of the sensor (center conductor). If the desired number of conversions have not been met as shown at step 8, the selected voltages are now set at step 4 in reverse fashion (1.5 to x+ and 3.5 to x−) and once again after an appropriate amount of time another sample is taken at step 6. After the two X-axis voltage configurations are determined, the difference of the sampled values is then stored in memory. The X-axis is then put into a high impedance state and now the Y-axis is excited at step 4 (3.5 to y+ and 1.5 to y−), and once again after an appropriate amount of time, another sample is taken step 6. If the desired number of conversions have not been met at step 8, the selected voltages are now set at step 4 to obtain another sample but now in reverse fashion (y+ to 1.5 and y− to 3.5), and once again after an appropriate time another sample is taken at step 6. After the two Y axis voltage configurations are complete, the difference of the sampled values is then stored in memory. The four different configurations of selected voltages serve as one conversion count. This process is repeated until a desired number of data collection routines and conversions have been completed at step 8. When sufficient conversions have been performed, average conversion values are determined at step 10 so that during the period of data collection, it can be determined whether the plane was generally off level and thus tilted along one or both planes.

When average values are obtained at step 10, these average values are compared to the high and low limit values at step 12 for each axis. If one of the averaged values is either higher or lower than its respective high or low value limit, a correction signal is generated at step 14. The correction signal that is generated may be a simple communication signal to trigger for example, a lamp, or the correction signal may be integrated with a drive system (hydraulic, pneumatic, electric, or other means) to raise or lower the appropriate vehicle end or side. In the recreational vehicle of FIG. 6, the sensing unit would produce a signal to the hydraulic or pneumatic system to raise of lower the leveling jacks. Regardless of the action or nonaction occurring from the average values obtained at step 10 another set of measured values are sought through a return to the setting of desired voltages at step 4.

Figure 5:
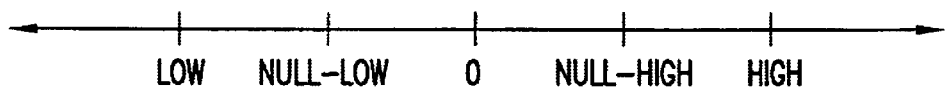
FIG. 5 is an illustration of the limit and null limit ranges associated with the present invention.

If a correction signal was generated, then another complete process is repeated in which the desired voltages are set at step 4, sampling of the sensor is conducted to obtain ATD at step 6, and another determination is made at step 8 to see if the desired number of conversions have been completed. If the results of the next sample fall within the average high and average low limits, then a system check is performed at step 16 to determine if a previously generated correction signal was activated. If a previously generated correction signal was activated, then the averaged values determined at step 10 are compared to the null limits at step 18 to determine if it is necessary to continue the active correction signal 14. If the averaged values at step 10 each fall within the respective null value ranges, then sufficient correction has occurred and the corrective action may be terminated, or the correction signal will be discontinued. On the other hand, if the averaged values 10 do not fall within the respective null value ranges, corrective action will be initiated and will be allowed to continue until newly detected averaged values return to a point within the null value limits, as illustrated in FIG. 5.

As will be understood by those skilled in the relevant arts, a plurality of programming routines may be used to achieve the functionality of the present system. However, an efficient and preferred routine is provided herewith to further demonstrate the preferred method of the present invention.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is:

1. A dynamic level detection and leveling method for maintaining a desired level position for a structure, said system comprising:
   selecting a first axis associated with a plane of the structure that a user desires to maintain level;
   selecting a second axis associated with said plane;
   selecting high and low value limits for tilt along the first axis and along the second axis;
   selecting high and low null value limits for tilt along the first axis and along the second axis;
   generating a selected number of measurements that reflect a level of tilt of the structure along each of the first and second axes;
   determining an average value of the measurements generated along each axis;
   comparing the average value obtained along each axis with the selected high and low value limits;
   initiating corrective action if the average value along an axis exceeds a selected high or low value limit;
   if corrective action is initiated, comparing the average value obtained along each axis with the selected high and low null value limit; and
   terminating corrective action when the average value along an axis is within the selected null value limits.

2. The dynamic level detection and leveling method of claim 1 in which the steps are performed by employing inclinosensors having conductometric measurement capabilities.

3. The dynamic level detection and leveling method of claim 2 in which the structure is a recreational vehicle having power operated leveling jacks, and the corrective action produces a signal to raise or lower the jacks thereby leveling the vehicle.

4. A dynamic level detection and leveling system for maintaining the plane of a structure at a desired level position, said system comprising:
   a first axis associated with the plane of the structure that a user desires to maintain level;
   a second axis associated with said plane;
   a first inclinosensor having conductometric measurement capabilities combined with the structure and having high and low value limits related to tilt along the first axis;
   a second inclinosensor having conductometric measurement capabilities combined with the structure and having high and low value limits related to tilt along the second axis;
   said first and second inclinosensors also having high and low null value limits related to tilt along the first axis and along the second axis, respectively;
   means for generating a selected number of measurements in said first and second inclinosensors that reflect a level of tilt of the structure along each of the first and second axes;
   means for determining an average value of the measurements generated along each axis;
   means for comparing the average value obtained along each axis with the selected high and low value limits;
   means for producing corrective action if the average value along an axis exceeds a selected high or low value limit;
   means for comparing the average value obtained along each axis with the selected high and low null value limit if corrective action is initiated; and means for terminating corrective action when the average value along an axis is within the selected null value limits.

5. The dynamic level detection and leveling system of claim 4 in which the structure is a recreational vehicle having power operated leveling jacks, and the corrective action produces a signal to raise or lower the jacks thereby leveling the vehicle.

* * * * *